(12) United States Patent
Song

(10) Patent No.: US 8,953,455 B2
(45) Date of Patent: *Feb. 10, 2015

(54) METHOD AND APPARATUS OF LOAD BALANCING FEMTOCELL CLUSTER ACCESS

(71) Applicant: Ubeeairwalk, Jhubei (TW)

(72) Inventor: Kiyoung Song, Plano, TX (US)

(73) Assignee: Ubeeairwalk (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,068

(22) Filed: Aug. 10, 2013

(65) Prior Publication Data

US 2013/0322250 A1 Dec. 5, 2013

Related U.S. Application Data

(63) Continuation of application No. 13/013,154, filed on Jan. 25, 2011, now Pat. No. 8,520,526.

(60) Provisional application No. 61/374,695, filed on Aug. 18, 2010.

(51) Int. Cl.
*H04J 1/16* (2006.01)
(52) U.S. Cl.
USPC ............................................. 370/236; 370/252
(58) Field of Classification Search
USPC .................... 370/230, 235, 236, 252
See application file for complete search history.

(56) References Cited

U.S. PATENT DOCUMENTS

| | | | |
|---|---|---|---|
| 2004/0266445 A1* | 12/2004 | Burgess et al. | 455/450 |
| 2006/0109818 A1* | 5/2006 | Ramanna et al. | 370/331 |
| 2006/0216564 A1* | 9/2006 | Arcella et al. | 429/32 |
| 2007/0217387 A1* | 9/2007 | Choi et al. | 370/342 |
| 2008/0125126 A1* | 5/2008 | Fang et al. | 455/436 |
| 2009/0093252 A1* | 4/2009 | Czaja et al. | 455/436 |
| 2009/0172169 A1* | 7/2009 | Ramaswamy et al. | 709/227 |
| 2009/0265543 A1* | 10/2009 | Khetawat et al. | 713/151 |
| 2011/0032824 A1* | 2/2011 | Eyuboglu et al. | 370/237 |
| 2011/0059689 A1* | 3/2011 | Haverty | 455/1 |
| 2011/0111771 A1* | 5/2011 | Barber | 455/456.1 |

* cited by examiner

*Primary Examiner* — Andrew Lee

(57) ABSTRACT

A method of establishing a communication session between an access terminal and an access network is disclosed. The access terminal and access network may be femtocells based on the EVDO communication standard. The example method of communication may include transmitting a connection request from the access terminal to the access network, and receiving a redirect message or a traffic channel assignment message at the access terminal based on a communication between the access network and at least one other access network. More than one access network may be present communicating as a communication pair system aimed at load balancing access terminals. The method may also include establishing packet data communications between the access terminal and a packet data serving node to provide network communication to the access terminal.

20 Claims, 7 Drawing Sheets

METHOD AND APPARATUS OF LOAD BALANCING FEMTOCELL CLUSTER ACCESS

CROSS REFERENCE TO RELATED APPLICATIONS

This application is a continuation of U.S. application Ser. No. 13/013,154, entitled "METHOD AND APPARATUS OF LOAD BALANCING FEMTOCELL CLUSTER ACCESS", filed on Jan. 25, 2011, now issued U.S. Pat. No. 8,520,526, issued on Aug. 27, 2013, which in turn claims benefit to provisional application 61/374,695, entitled "Load Balancing and CA-SIM Restricted ESM List", filed on Aug. 18, 2010, the entire contents of each of which are hereby incorporated by reference.

TECHNICAL FIELD OF THE INVENTION

This invention relates to a method and apparatus of load balancing between multiple network switches, and, more specifically, to load balancing user access to a network, including, call establishment, maintained connectivity, call assignment, etc.

BACKGROUND OF THE INVENTION

Broadband networks are continuing to grow in common areas, such as, the workplace and the home. Femtocells are being used at the enterprise level with the goal of extending wide area data coverage to the office. The femtocell has been considered a potential candidate to replace the enterprise wireless LAN entirely.

In the GSM-UMTS world, operators and vendors are exploring uses for unlicensed mobile access (UMA), which currently provides services to residential dual-mode Wi-Fi deployments, for tunneling voice traffic from an enterprise femto-network to the core network. Other options may include implementing the SIP protocol used in VoIP networks to be part of the wireless networks as well. Optimally, a SIP-based femto-network may provide a wide variety of services to the end users. However, at a minimum, network integration efforts would require convergence servers to connect legacy voice networks to the SIP-based architecture at the enterprise level.

In addition to using the femtocell to expand the public wireless network inside the limited constraints of the enterprise, the private enterprise network would likely be linked to public networks as well. Enterprise networks could deploy data femtocells alongside of voice femtocells. The data femtocell configuration would create a private network through the enterprise's own data connection(s). In such a case, the network operator would not be concerned with broadband capacity being removed from the macro-network. Load-balancing may be incorporated into femtocell architecture to increase efficiency and user access to the network.

SUMMARY OF THE INVENTION

One example embodiment of the present invention may include a method of establishing a communication session between an access terminal and an access network. The method may include transmitting a connection request from the access terminal to the access network, and receiving at least one of a redirect message and a traffic channel assignment message at the access terminal based on a communication between the access network and at least one other access network. The method may also include establishing packet data communications between the access terminal and a packet data serving node.

Another example embodiment of the present invention may include an apparatus configured to establish a communication session with an access network. The apparatus may include a transmitter configured to transmit a connection request to the access network and a receiver configured to receive at least one of a redirect message and a traffic channel assignment message based on a communication between the access network and at least one other access network. The apparatus may also include a processor configured to establish packet data communications with a packet data serving node.

DETAILED DESCRIPTION OF THE INVENTION

Figure 1:
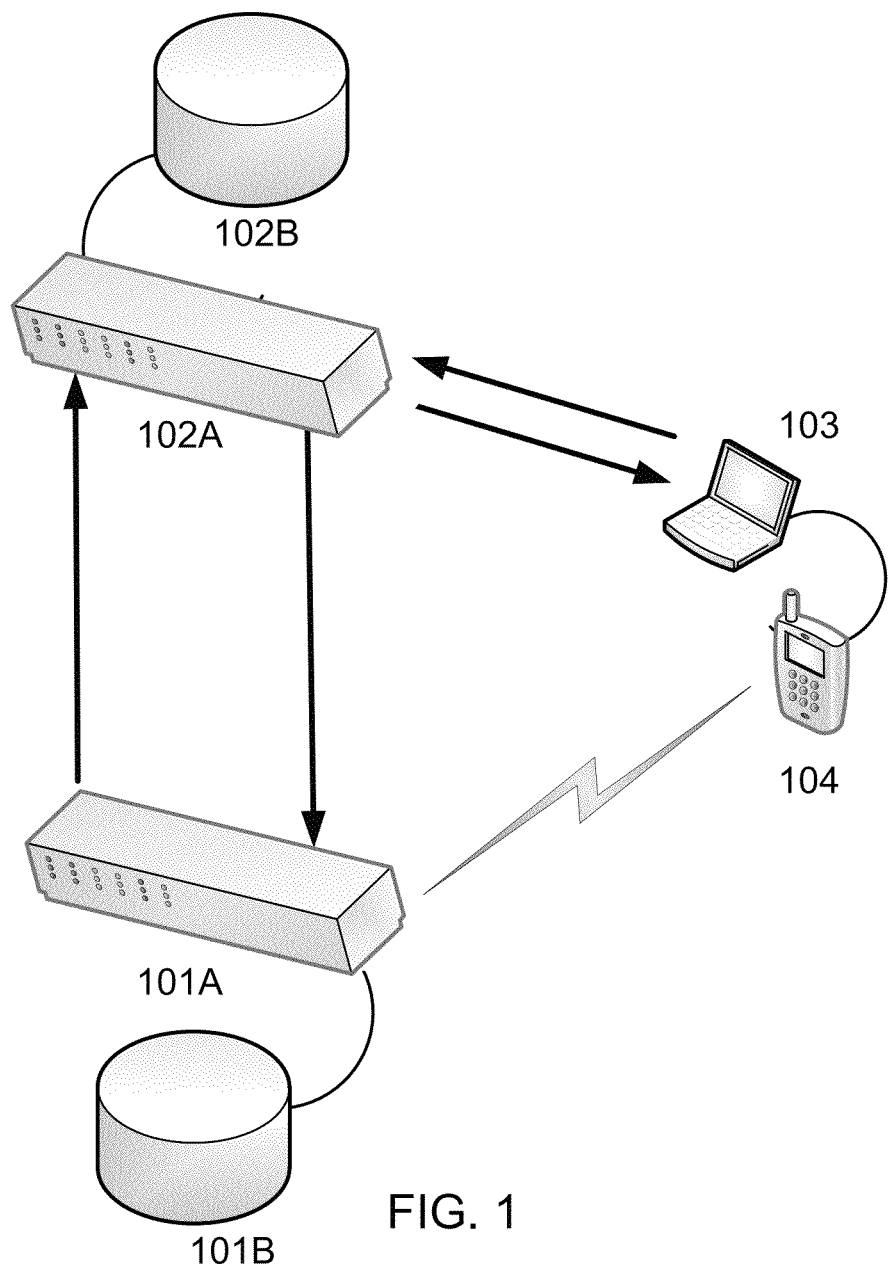
FIG. 1 illustrates an example load balancing network configuration according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention disclose load-balancing systems, configurations and devices that perform the same. In general, load-balancing is the operation of handling a number of active users by uniformly distributing the users within two or more access networks (ANs), base stations (BSs) and/or femtocells, which cover a common area. In one example, the network service providers may occupy or cover the same area with a different frequency used to distinguish the different service provider.

Example terms used throughout the specification are defined in detail below:
1) AN: Access Network.
2) FA: Frequency Allocation/Assignment (Carrier).
3) AT: Access Terminal.
4) MT: Mobile Terminal.
5) PLD: Program Loaded Data.
6) PCF: Packet Control Function.
7) TCH: Traffic Channel.
8) UATI: Unicast Access Terminal Identifier.
9) FTC: Forward Traffic Channel.
10) RTC: Reverse Traffic Channel.
11) TCA: Traffic Channel Assignment.
12) PDSN: Packet Data Serving Node.
13) RAN: Radio Access Network.
14) R-P (connection): RAN to PDSN connection.

According to example embodiments of the present invention, there may be two switches performing load-balancing of access and connection support to the femtocell. The two switches may be represented as two ANs, BSs or femtocells.

Active calls are one example of data load-balancing that may be performed by the load-balancing switches.

According to example embodiments of the present invention, an FA load balance function may be performed for one or more pairs of EVDO communication systems. FIG. 1 illustrates an example load balancing communication system according to example embodiments of the present invention. Referring to FIG. 1, a load balance pair of communication switches 101A and 102A are illustrated as being in communication with corresponding data storage devices (databases) 101B and 102B, respectively. The databases may be part of the communication switches 101A and 102A or may be separate devices. Mobile terminal (MT) 104 is illustrated as being connected to computer device 103. MT 104 may access the network wirelessly through a tethering application supported by the computer device 103 or directly via a wireless link.

In the network configuration of FIG. 1, one communication switch 101A/102A may generally support three femtocell access units (FAs), and, one FA may generally support three sectors. Alternatively, three FAs may support one omni-sector. According to example embodiments of the present invention, this configuration may be implemented as a temporary solution to support a 2FA/3sector system configuration.

Figure 2:
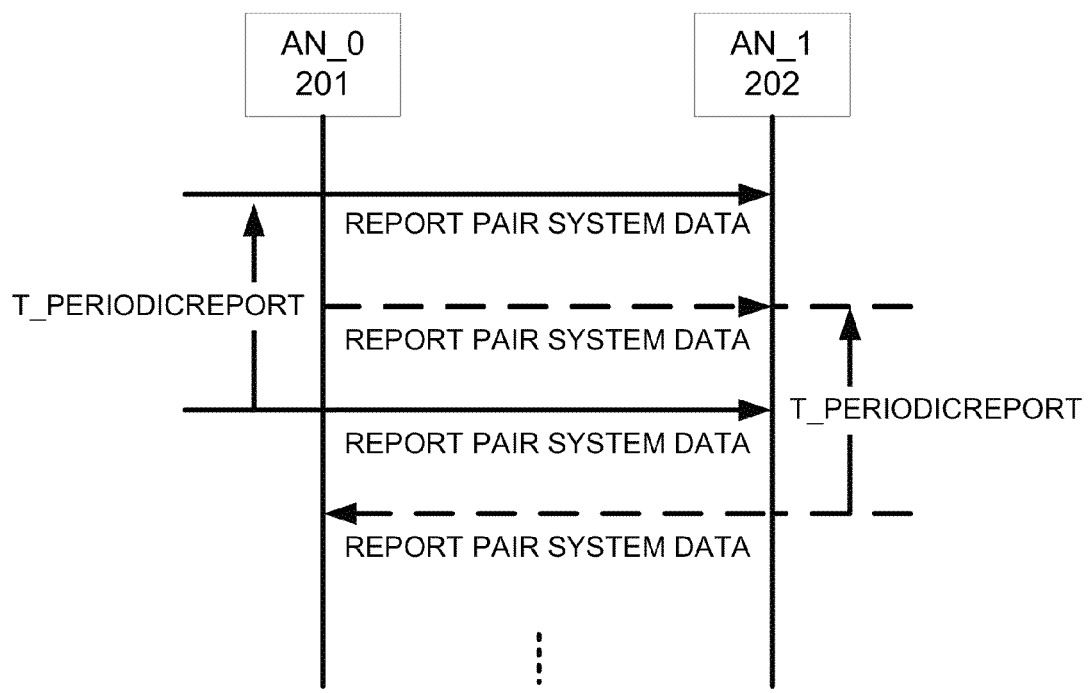
FIG. 2 illustrates a communication diagram of the signaling between network devices and/or access networks according to example embodiments of the present invention.

FIG. 2 illustrates an example signaling diagram among access network devices AN_0 201 and AN_1 202. Referring to FIG. 2, an example of communication signaling among the network elements may include periodically exchanging load balance related information between the 2FA pair system of devices 201 and 202. Both 201 and 202 may be considered access points that broadcast channel list information. The channel list information may include certain information, such as, the number of channels and their respective channel identification numbers, such as, 1025 and 1075, respectively. The channel numbers may correspond to the channel frequency allocations.

Referring again to FIG. 1, the AT 103 monitors device 102A and transfers a call to device 102A. In response, device 102A responds by instructing AT 103 to connect to device 101A due to load balancing purposes. AT 103 may be connected with device 101A based on the instruction received from device 102A. The call flow for load balancing may be executed when certain conditions are fulfilled. For example, one condition may be fulfilled when the difference between the number of the allocated customer equipments (CEs) operating within the pair system of 101A and 102A is greater than an established threshold number (pair_bs_threshold). Also, according to another example, the "RequestReason" of the "ConnectionRequest" message is not access network initiated.

The value "0x1" is the value of a "RequestReason" value, which is used to indicate the "ConnectionRequest" from the AT, in response to the page message transmitted from the AN based on the EVDO standard. Specifically, the value "0x1", indicates that the response to the page is exempt. Periodic exchanging of the information between the communication devices is normal, the pair system's resources, such as, sector status are normal, and the initial session negotiation is not needed.

In another example, if all of the following conditions are satisfied, the AN device 101A and/or 102A will instruct the MT 104 to lock on to the other AN device that is bound to the pair system. For example, when the AN device 101A or 102A receives a "ConnectionRequest" message from the AT 103, and the AN is supported, the EVDO session of AT 103 and the EVDO session negotiation was already performed. Or, alternatively, the AN device 101A or 102A does not have the EVDO session of AT 103. Additional requirements may include the feature enable flag for the load balance between the pair systems is set to ON, the "ReportPairSystemData" message from the pair system is received within the previous "T_PeriodicReport" (sec) period. The difference of the active call count between the one AN device 101A or 102A and the corresponding pair system exceeds the threshold value, and the status of sector of the pair system is normal. As noted above, all of the listed requirements or any combination thereof may be required prior to instructing the MT 104 to lock on to a particular AN device.

Example parameters to control through PLD may include an IP address of the AN bounded to its own pair system. The enable flag for the on/off of the function of the load balance between the pair systems, the time value for "T_PeriodicReport", and the threshold value for the difference of the active call count between the pair systems. Such parameters may be controlled by operations, administration, and management (OA&M) network elements, such as, a base station manager. The parameters may be controlled and monitored to be used as the basis for determining when and how to load balance.

Example PLD configuration parameters are described in detail below in table 1.

TABLE 1

| Parameter | Value | Description |
|---|---|---|
| pair_bs_flag | ON/OFF | Enable/Disable the load balance. |
| pair_bs_ip_addr | xxx.xxx.xxx.xxx | IP address for the system which is bound to the pair. |
| pair_bs_time_period | 3~180 (sec) | Time period to exchange the information between one pair of systems. |
| pair_bs_threshold | 5~96 (sec) | The minimum difference value of the # of the allocated CEs (Channel Element) between one pair of systems. |

FIG. 2 illustrates an example of an exchange of data between the pair system AN devices 101A and 102A. The data exchanged may be stored in the corresponding storage devices 101B and 102B and accessed in a similar manner. The AN_0 201 and the AN_1 202 may communicate by exchanging pair system data based on the load balancing effort. Periodic messages may be exchanged at set intervals based on a predetermined parameter "T_PeriodicReport." Certain data that may be exchanged may include bandclass information, channel number updates (ch_num), current active call count (including handoff calls), status information of each sector such as, tx/rx on and off, etc. In the event that an AN 101A and/or 102A does not receive the "ReportPairSystemData" message from the pair system, the AN will stop the load balance function for the next time period "T_PeriodicReport."

During the information exchanging performed between access network devices 201 and 202, the information communicated may include the number of active users and channel resource status. A broadcast channel list may be communicated among the ANs 201 and 202, as well as to the AT 103 notifying the connecting devices which frequencies are available at the location where the ATs are located. The AN 201 and/or 202 may broadcast this information to all users of the femtocell as part of a broadcast overhead message. Common wireless interface standards, such as, CDMA2000 and 1XRTT/EVDO may be used as a basis for the content included in the overhead message, which can include channel list information that is broadcast to neighboring network elements.

Figure 3:
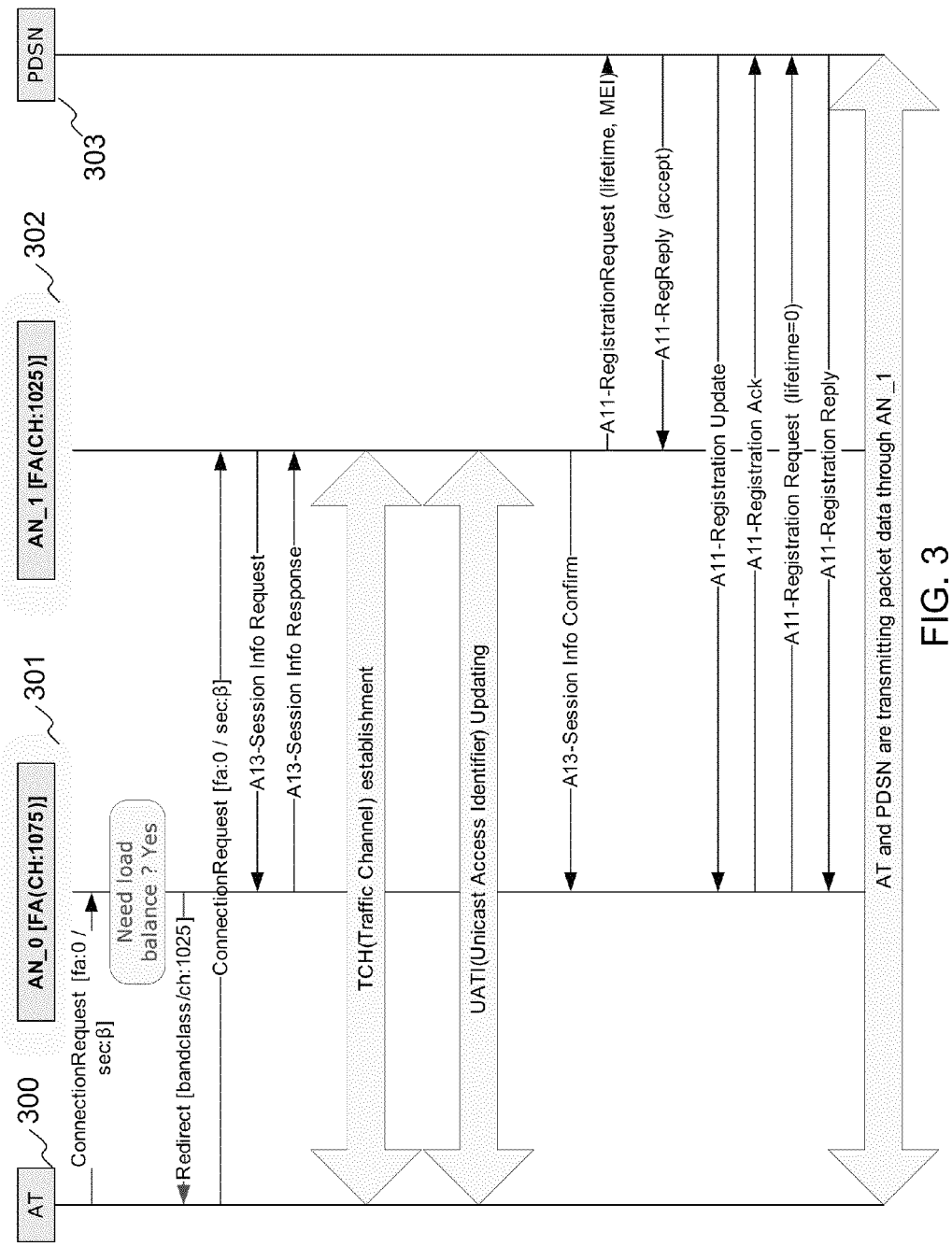
FIG. 3 illustrates a signaling diagram that illustrates example signaling that is transferred between the access terminal, access network and the packet data serving node upon receiving a session initiation request and connection attempt.

FIG. 3 illustrates an example message flow diagram of a connection establishment session, according to example embodiments of the present invention. Referring to FIG. 3, an access terminal 300 (i.e., cell phone, laptop, smart device, etc.) may transmit a connection request message to one of the access network terminals 301 and/or 302. The connection request may include a frequency allocation (FA) parameter (fa: 0) and/or a sector parameter β. In this example, those parameters are null or undefined prior to establishing a connection.

The AN 301 may be assigned to a particular channel or frequency FA(CH: 1075), which indicates a 1075 MHz frequency. A determination is made as to whether the AN 301 needs to be load balanced, and, if so, a redirect message is transmitted back to the AT 300 indicating the channel information of the other AN 302 (bandclass/ch: 1025). A load balancing procedure will be executed if certain conditions are TRUE, such as, the difference of the number of allocated CEs between the pair systems (pair_bs_threshold), a "ConnectionRequest" from AT fails to response to the page sent from the AN, the periodic exchange of the information between the systems is normal, and/or radio frequency (RF) operation status is normal.

A similar message to the one transmitted earlier to AN 301 may now be transmitted from the AT 300 to the AN 302 requesting a connection. AN 302 may then transmit an A13 session information request, which contains the air interface protocol attributes and associated public data, such as, ESN, IMSI, PDSN, IP address information, etc. However, if this function is applied to other radio access network (RAN) technologies, similar information used by varying standards may be substituted for the A13 session information. The session information may be created at the AN 301 according to an EVDO air interface standard, such as, 3GPP2-C.S0024.

When the traffic channel establishment is successful, access to the Internet is still not available, as a connection to the PDSN 303 must first be successfully opened. The UATI is the identifier used in EVDO networks, which is then updated whenever an AT enters the service area of an AN. The A13 session information is confirmed when the A13 session information is transferred between EVDO systems. A three-way handshake procedure is used to confirm that the session information is successfully transferred. An A11 registration request message is sent from an AN 301 to the PDSN 303 when the AN 301 requests to open the connection between the AN 301 and the PDSN 303. The lifetime message is the time that the connection between the AN 301 and the PDSN 303 can keep alive without registration after it is established. The mobility event indicator (MEI) is used for a mobile mobility function. The A11 information exchanged between the AN_0 301 and the PDSN 303 is used to release the connection between the AN_0 301 and the PDSN 303 since the connection between the AN_1 302 and PDSN 303 is established. The lifetime value is set to "0" because the connection is not alive any more. The last arrow indicates that the AT 300 is connected to a network (i.e., Internet) through the PDSN 303. The requirements for this message flow may require that the AN exchange the load balance information needed for the load balance function through the "ReportPairSystemData" message, and when making the decision that the load balance is needed, the AN sends the redirect message to the AT 103.

Figure 4:
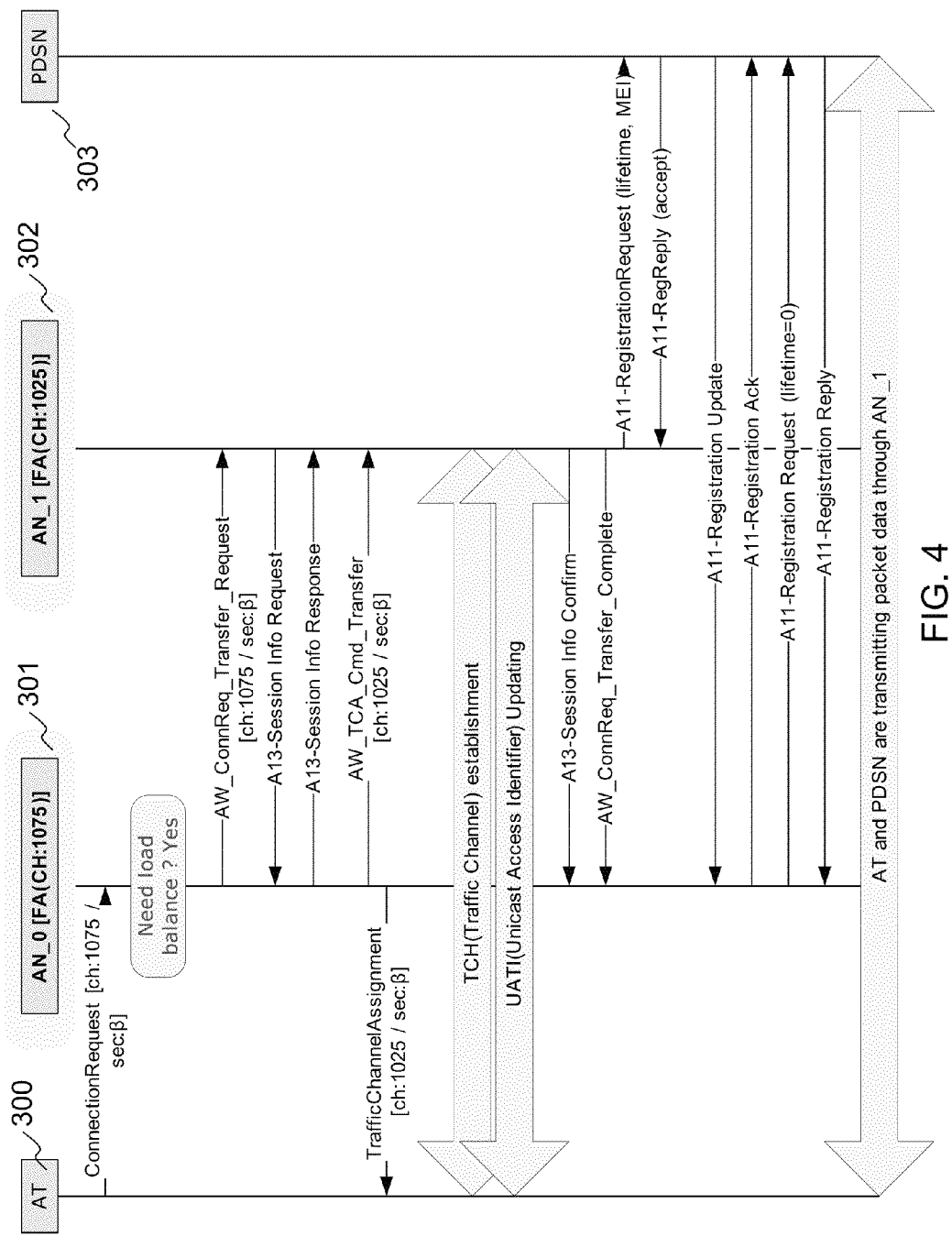
FIG. 4 illustrates another example signaling diagram that illustrates example signaling that is transferred between the access terminal, access network and the packet data serving node upon receiving a session initiation request and connection attempt.

FIG. 4 illustrates an example message flow diagram for a traffic channel assignment (TCA) message communication, according to example embodiments of the present invention. Referring to FIG. 4, when the AN instructs the AT 300 to move to another frequency, there are two options for proceeding with the CDMA 1X/EVDO air interface. One option may be to use a redirect message as illustrated in FIG. 3. The other option is to use a traffic channel assignment message, as illustrated in FIG. 4.

Referring to FIG. 4, the traffic channel assignment (TCA) message can contain another frequency similar to the redirect message. In terms of a signaling interface, the case of redirect (see FIG. 3) is simpler than the case of using a TCA, as illustrated in FIG. 4. However, the use of a TCA is more stable and it takes less time to complete a connection setup. If the AT 300 receives the redirect message from the AT 301 in response to the connection request, the AT 300 should normally re-start connection request procedures from the beginning after switching the frequency. However, if the AN 301 instructs the AT 300 to switch the frequency using a TCA message, then the AT 300 just switches the frequency and then opens the traffic channel.

Referring again to FIG. 4, the AW_TCA_cmd_transfer message contains a TCA message, which AN_1 302 creates to send to AT 300. The AN_1 302 creates the TCA message since the traffic channel resources in the AN_1 302 are allocated. The AT 300 is first connected with AN_0 301. Then, the TCA message is sent from AN_1 302 through AN_0 301 as an indicator for transferring the TCA message between ANs. As indicated in FIG. 4, subsequent signaling operations are similar to FIG. 3 and may be referenced accordingly.

Figure 5:
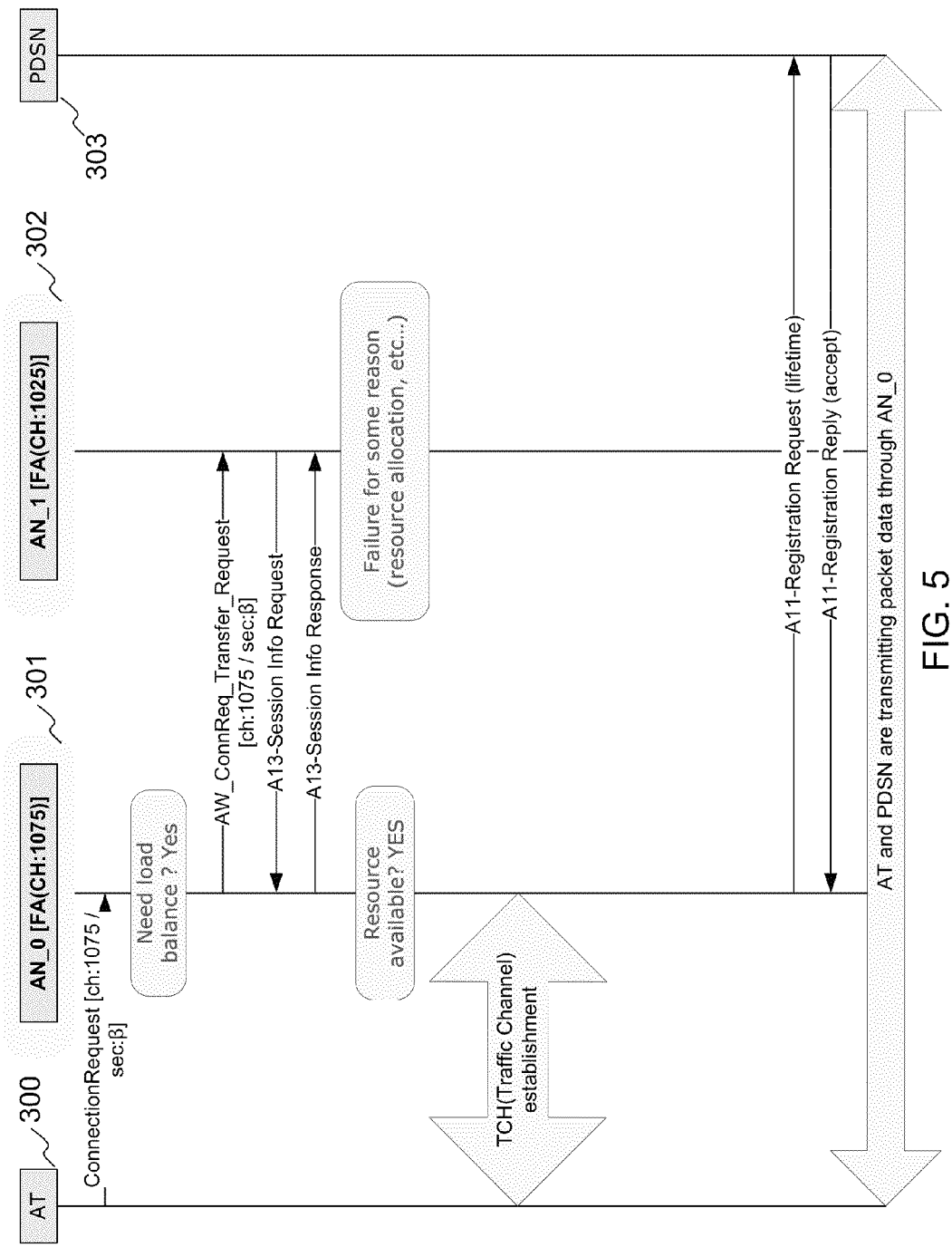
FIG. 5 illustrates a signaling diagram that illustrates example signaling that is transferred between the access terminal, access network and the packet data serving node in the event of a failed connection attempt.

FIG. 5 illustrates an example message flow diagram for a failed message communication, according to example embodiments of the present invention. Referring to FIG. 5, in the event of a failure in communication signaling, the unnecessary back-and-forth connection signaling must be kept to a minimum until the error is corrected (ping-pong effect). For example, if the AN_0 301 discovers the failure of the call transfer to the pair system 302 via the transfer request, then the AN_0 will try to establish a connection through itself to the PDSN 303. When the AN_0 301 determines that the load balance is needed or not, a "REPORT_PAIR_SYSTEM_DATA" message will be transferred from the other AN. But, when the AN is performing a TCA, there may be other problems, such as, internal errors within the call processing s/w module, which the "REPORT_PAIR_SYSTEM_DATA" information may not be able to support.

Example operations of load balancing among femtocell access networks will now be described in detail below with reference to one or more of FIGS. 3-5. According to one example embodiment of the present invention with reference to FIG. 3, one scenario may provide that the AN_0 301 determines that load balancing is not necessary and the AT 301 is connected to the PDSN 303 through AN_0 301 when assuming AN_0 301 and AN_1 302 are paired. The generalized operations may include turning on the transmitter/receiver of AN_0 301 and turning off the transmitter/receiver of AN_1 302. The ATs 300 may then become active on each AN simultaneously (AN_0: # of active user=0, AN_1: # of active user=0). The difference in the number of active users between AN_0 and AN_1 is less than pair_bs_threshold is determined. Next, it is confirmed that the AT 300 monitors AN_0, and that AN_0 has the test AT's EVDO session. If not, the test AT's EVDO session on AN_0 is created on AN_0. The transmitter/receiver of the AV_1 is turned on and a call is made to AN_0. It is then verified whether the AN_0 requires a load balance and a connection between the AT 300 and the PDSN 303.

According to another example embodiment of the present invention with reference to FIG. 4, the "AN_0" determines that load balancing is needed and the AT 300 is connected to PDSN 303 through AN_1 302, assuming AN_0 and AN_1 are paired. The generalized operations may include turning on the transmitter/receiver of AN_0 301 and turning off the transmitter/receiver of AN_1 302. The ATs 300 may then become active on each AN simultaneously (AN_0: # of active user=5, AN_1: # of active user=0). The difference in the number of active users between AN_0 and AN_1 is greater than the pair_bs_threshold is determined. Next, it is confirmed that the AT 300 monitors AN_0, and that AN_0 has the test AT's EVDO session. If not, the test AT's EVDO session on AN_0 is created on AN_0. The transmitter/receiver of the AV_1 is turned on and a call is made to AN_0. It is then verified that the AN_0 requires a load balance, and, that the AN_0 transfers a call to AN_1, which establishes a connection for the AT 300 to the PDSN 303.

According to another example embodiment of the present invention with reference to FIG. 5, the "AN_0" determines that load balancing is needed and the AT 300 is connected to PDSN 303 through AN_1 302, assuming AN_0 and AN_1 are paired. However, in this case, an attempt to establish a connection with AN_1 302 failed. The generalized operations may include turning on the transmitter/receiver of AN_0 301 and turning off the transmitter/receiver of AN_1 302. The ATs 300 may then become active on each AN simultaneously (AN_0: # of active user=5, AN_1: # of active user=0). The difference in the number of active users between AN_0 and AN_1 is greater than the pair_bs_threshold is determined. Next, it is confirmed that the AT 300 monitors AN_0, and that AN_0 has the test AT's EVDO session. If not, the test AT's EVDO session on AN_0 is created on AN_0. The attempt to establish a connection with AN_1 is detected and a failure condition is configured. The transmitter/receiver of the AV_1 is turned on and a call is made to AN_0. It is then verified that the AN_0 requires a load balance, and, that the AN_0 transfers a call to AN_1, which does not respond to the call request. The AN_0 then establishes a connection for the AT 300 to the PDSN 303 after detecting the failure.

Figure 6:
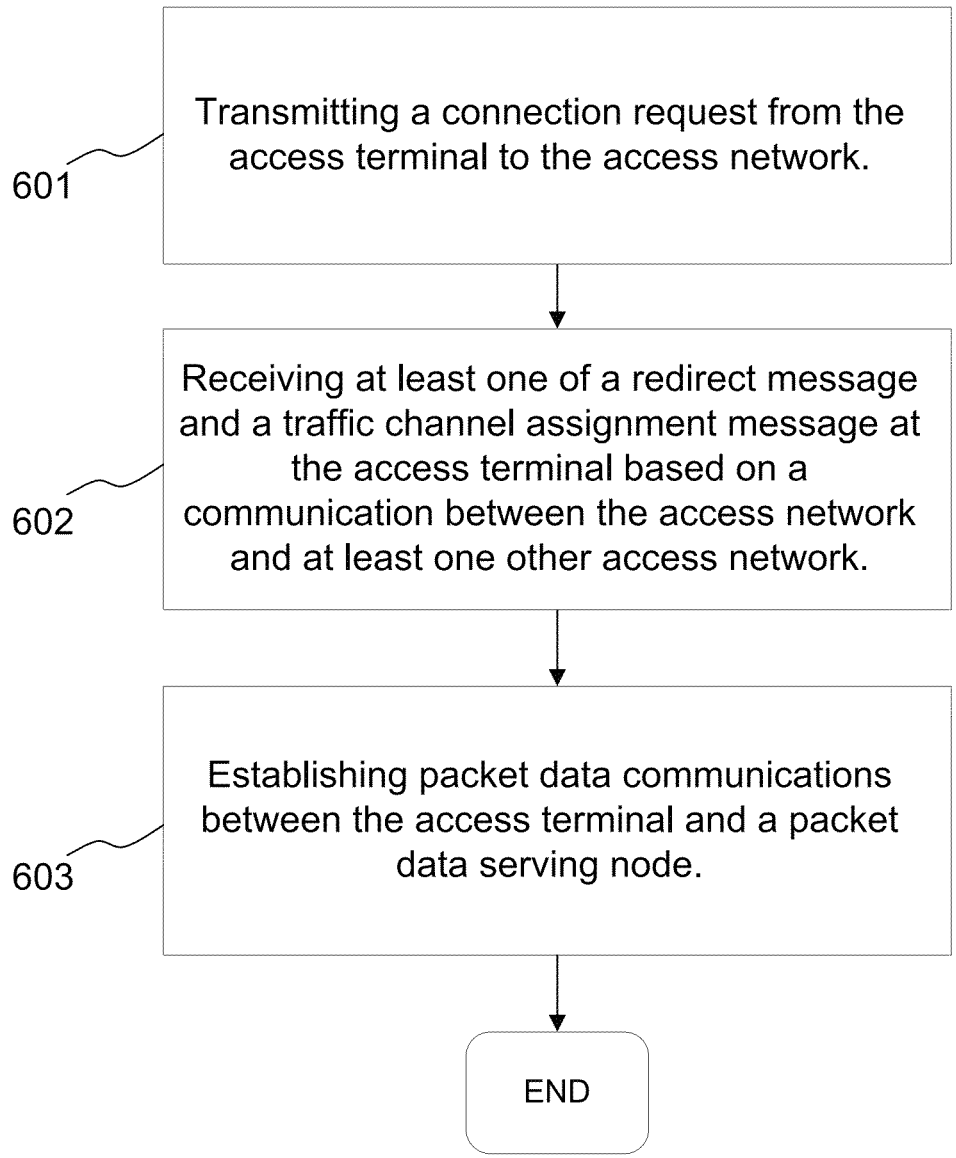
FIG. 6 illustrates an example flow diagram of an example method according to example embodiments of the present invention.

One example method of operation may include a method of establishing a communication session between an access terminal and an access network, as illustrated in FIG. 6. The method may include transmitting a connection request from the access terminal to the access network, at operation 601. Receiving at least one of a redirect message and a traffic channel assignment message at the access terminal based on a communication between the access network and at least one other access network, at operation 602 and establishing packet data communications between the access terminal and a packet data serving node, at operation 603.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 101, 102, 103, 104, 201, 202, 300, 301 and 302.

Figure 7:
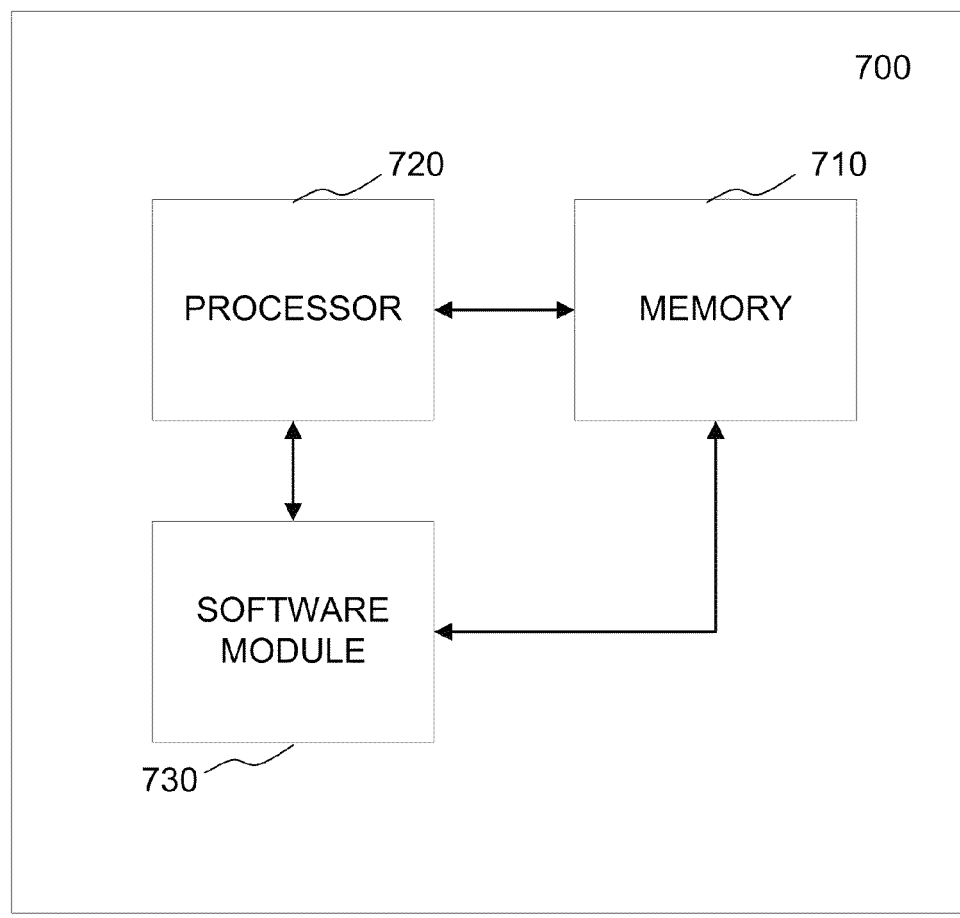
FIG. 7 illustrates an example network entity that may store, process and execute software instructions embodied thereon, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
transmitting a connection request from an access terminal to an access network;
receiving at least one of a redirect message and a traffic channel assignment message at the access terminal based on a communication between the access network and at least one other access network; and
determining that load balancing is necessary;
wherein determining that load balancing is necessary comprises comparing a number of active users on the access network to a number of active users on the at least one other access network and determining that a difference between the number of active users on the access network and the number of active users on the at least one other access network is less than or greater than a predetermined threshold value.

2. The method of claim 1, further comprising transferring information regarding the at least one other access network to the access terminal.

3. The method of claim 2, wherein the information regarding the at least one other access network comprises channel frequency information.

4. The method of claim 2, wherein the access network and the at least one other access network are configured as a load balancing pair system.

5. The method of claim 1, comprising establishing packet data communications between the access terminal and a packet data serving node.

6. The method of claim 5, wherein establishing packet data communications between the access terminal and a packet data serving node comprises connecting the access terminal to the Internet.

7. The method of claim 1, further comprising establishing an active connection between the access terminal and the access network and the at least one other access network simultaneously.

8. An apparatus, comprising:
a transmitter configured to transmit a connection request to an access network, wherein the access network is configured to determine that load balancing is necessary; and
a receiver configured to receive at least one of a redirect message and a traffic channel assignment message based on a communication between the access network and at least one other access network;
wherein the determination that load balancing is necessary further comprises a comparison between a number of active users on the access network to a number of active users on the at least one other access network and a determination that a difference between the number of active users on the access network and the number of active users on the at least one other access network is less than or greater than a predetermined threshold value.

9. The apparatus of claim 8, wherein the receiver is further configured to receive transfer information regarding the at least one other access network.

10. The apparatus of claim 9, wherein the transfer information regarding the at least one other access network comprises channel frequency information.

11. The apparatus of claim 9, wherein the access network and the at least one other access network are configured as a load balancing pair system.

12. The apparatus of claim 8, comprising a processor configured to establish packet data communications with a packet data serving node.

13. The apparatus of claim 12, wherein the processor is configured to establish packet data communications by establishing a connection to the Internet.

14. The apparatus of claim 8, wherein the processor is further configured to establish an active connection to the access network and the at least one other access network simultaneously.

15. A non-transitory computer readable storage medium comprising instructions that when executed cause a processor to perform establishing a communication session between an access terminal and an access network, the processor being further configured to perform:
transmitting a connection request from the access terminal to the access network;
receiving at least one of a redirect message and a traffic channel assignment message at the access terminal based on a communication between the access network and at least one other access network; and
determining that load balancing is necessary;
wherein determining that load balancing is necessary further comprises comparing a number of active users on the access network to a number of active users on the at least one other access network and determining that a difference between the number of active users on the access network and the number of active users on the at least one other access network is less than or greater than a predetermined threshold value.

16. The non-transitory computer readable storage medium of claim 15, wherein the processor is further configured to perform transferring information regarding the at least one other access network to the access terminal.

17. The non-transitory computer readable storage medium of claim 16, wherein the information regarding the at least one other access network comprises channel frequency information.

18. The non-transitory computer readable storage medium of claim 16, wherein the access network and the at least one other access network are configured as a load balancing pair system.

19. The non-transitory computer readable storage medium of claim 15, comprising establishing packet data communications between the access terminal and a packet data serving node, wherein establishing packet data communications between the access terminal and a packet data serving node comprises connecting the access terminal to the Internet.

20. The non-transitory computer readable storage medium of claim 15, wherein the processor is further configured to perform establishing an active connection between the access terminal and the access network and the at least one other access network simultaneously.

* * * * *